United States Patent [19]

Katayama

[11] Patent Number: 4,669,332

[45] Date of Patent: Jun. 2, 1987

[54] POWER TRANSFER DEVICE FOR FOUR WHEEL DRIVE

[75] Inventor: Nobuaki Katayama, Toyota, Japan

[73] Assignee: Toyota Jidosha Kabushiki Kaisha, Japan

[21] Appl. No.: 637,282

[22] Filed: Aug. 3, 1984

[30] Foreign Application Priority Data

Aug. 4, 1983 [JP] Japan .......................... 58-121552[U]

[51] Int. Cl.[4] ............................................ F16H 37/08
[52] U.S. Cl. ........................................ 74/701; 74/710
[58] Field of Search ...................... 74/710, 701, 665 F, 74/665 EC, 694, 695, 700; 180/247, 248, 249, 250

[56] References Cited

U.S. PATENT DOCUMENTS

| | | | |
|---|---|---|---|
| 3,908,775 | 9/1975 | Van Fossen | 180/250 |
| 3,956,945 | 5/1976 | Eggleton et al. | 74/710 X |
| 4,304,317 | 12/1981 | Vanzant et al. | 180/250 X |
| 4,431,079 | 2/1984 | Suzuki | 180/247 X |
| 4,441,575 | 4/1984 | Suzuki | 180/248 |
| 4,457,394 | 7/1984 | Suzuki | 180/248 X |
| 4,476,952 | 10/1984 | Suzuki | 180/247 |
| 4,476,953 | 10/1984 | Hiraiwa | 180/247 X |

FOREIGN PATENT DOCUMENTS

| | | | |
|---|---|---|---|
| 73422 | 8/1980 | Japan . | |
| 58-30834 | 2/1983 | Japan | 180/247 |
| 58-63525 | 4/1983 | Japan | 180/248 |

*Primary Examiner*—Leslie Braun
*Assistant Examiner*—Joseph M. Rolnicki
*Attorney, Agent, or Firm*—Parkhurst & Oliff

[57] ABSTRACT

A power transfer device for four-wheel drive in combination with a power transmission having a differential gear unit for front-wheel drive. The power transfer device comprises a transfer casing detachably secured at one side thereof to the transmission casing, a carrier member rotatably mounted within the transfer casing and arranged coaxially with the differential gear unit, an output gearing assembled within the transfer casing and arranged to be driven by the carrier member for rear-wheel drive, a front-wheel axle drivingly connected at its inner end with the differential gear unit and extending outwardly through the transfer casing, and a hollow shaft arranged in surrounding relationship with the front-wheel axle and slidably engaged at its one end portion with the carrier member to be shifted to a position in which the other end of the hollow shaft is brought into engagement with the differential gear unit for four-wheel drive.

4 Claims, 3 Drawing Figures

POWER TRANSFER DEVICE FOR FOUR WHEEL DRIVE

BACKGROUND OF THE INVENTION

The present invention relates to a power transmission for automotive vehicles, and more particularly to a power transfer device for four-wheel drive in combination with the power transmission.

As is illustrated in FIG. 3 of the accompanying drawings, a conventional power transfer device of this kind is adapted to a power transmission for front-wheel drive which comprises a differential gear unit 1 of the bevel gear type for front-wheel drive rotatably mounted witin a transmission casing 4, and a hollow shaft 5 rotatably mounted within an extended portion of the transmission casing 4 coaxially with the differential gear unit 1. In such an arrangement, a ring gear 3 for front-wheel drive is fixedly mounted on a gear case 7 of the differential gear unit 1 and permanently in mesh with an output gear 2 of the power transmission, while a second ring gear 6 is fixed to the hollow shaft 5 and permanently in mesh with a drive pinion for rear-wheel drive. The gear case 7 has a hollow shaft portion 8 on which a clutch sleeve 9 is axially slidably mounted by a spline connection to be shifted by a shift fork 10. When shifted toward the hollow shaft 5, as is illustrated in the figure, the clutch sleeve 9 is brought into engagement with a spline 12 of hollow shaft 5 to drivingly connect the gear case 7 with the hollow shaft 5 for four-wheel drive. When shifted toward the differential gear unit 1, the clutch sleeve 9 disengages from the spline 12 of hollow shaft 5 to disconnect the gear case 7 from the hollow shaft 5 for front-wheel drive.

In the power transfer device described above, an original differential gear unit for front-wheel drive may not be adapted as a base for four-wheel drive due to provision of the extended portion of transmission casing 4, the hollow shaft 5, and the hollow shaft portion 8 of gear case 7. For this reason, such a conventional power transfer device is costly in its manufacture. Furthermore, the clutch sleeve 9 is driven by the differential gear unit 1 even in operation for front-wheel drive. This results in power losses of the vehicle engine and defacement of the clutch sleeve 9 due to frictional engagement with the shift fork 10.

SUMMARY OF THE INVENTION

It is, therefore, a primary object of the present invention to provide an improved power transfer device for four-wheel drive in which an original differetinal gear unit for a power transmission can be adapted as a base for four-wheel drive in a simple construction.

Another object of the present invention is to provide an improved power transfer device for four-wheel drive, having the above-described characteristic, in which additional component parts for four-wheel drive remain inoperative during operation of the device for front-wheel drive to avoid power losses and defacement of the component parts.

According to the present invention, there is provided a power transfer device for four-wheel drive in combination with a power transmission having a transmission casing secured at one side thereof to a cylinder block of an internal combustion engine, an input shaft rotatably mounted within the transmission casing and arranged coaxially with a crankshaft of the engine, an output shaft rotatably mounted within the transmission casing in parallel with the input shaft, a change-speed gearing mounted on the input and output shafts, an output gear integral with the output shaft, and a differential gear unit rotatably mounted within the transmission casing and drivingly connected to the output gear. The power transfer device comprises a transfer casing detachably secured at one side thereof to the transmission casing, a carrier member rotatably mounted within the transfer casing and arranged coaxially with the differential gear unit, an output gearing assembled within the transfer casing and drivingly connected to the carrier member, a first wheel axle drivingly connected at its inner end with the differential gear unit and extending outwardly through the transmission casing, a second wheel axle drivingly connected at its inner end with the differential gear unit and extending outwardly through the transfer casing, and a hollow shaft arranged in surrounding relationship with the second wheel axle and slidably engaged at its one end portion with the carrier member to be shifted to a first position in which the other end of the hollow shaft is brought into engagement with the differential gear unit for four-wheel drive and to a second position in which the other end of the hollow shaft is disengaged from the differential gear unit.

BRIEF DESCRIPTION OF THE DRAWINGS

Additional objects and advantages of the present invention will become readily apparent from the following detailed description of a preferred embodiment thereof when taken together with the accompanying drawings, in which.

DETAILED DESCRIPTION OF THE PREFERRED EMBODIMENT

Figure 1:
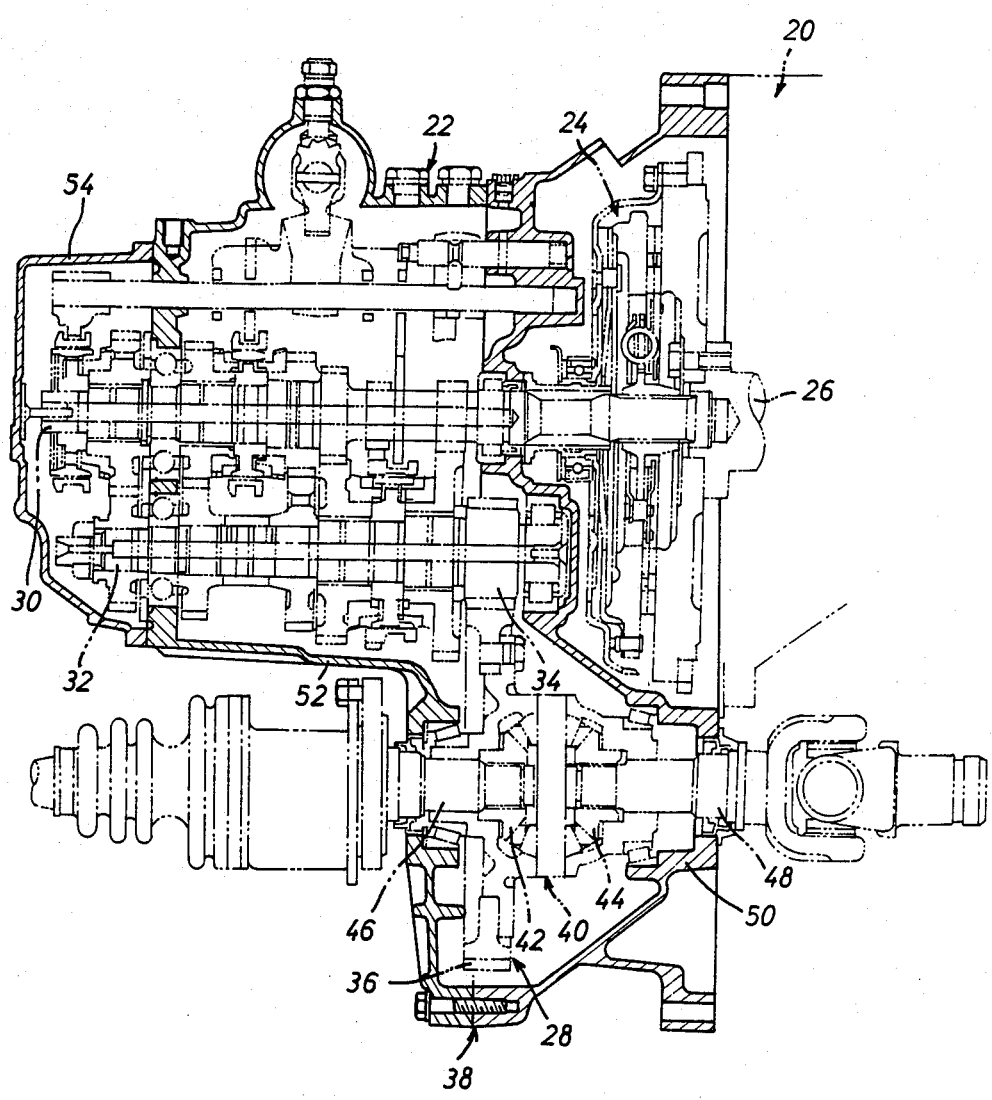
FIG. 1 is a sectional view of a power transmission including a differential gear unit for front-wheel drive.

Referring now to the drawings, FIG. 1 illustrates a power transmission 22 for a vehicle of the front-engine front-wheel drive type to which a power transfer device for four-wheel drive according to the present invention is adapted. The power transmission 22 is fixedly mounted to one side of an internal combustion engine 20 through a clutch device 24. The engine 20 is arranged within a front engine room of the vehicle in such a manner that a crankshaft 26 of the engine is transversely placed. The power transmission 22 includes a transmission casing assembly 38 secured at one side thereof to a cylinder block of the engine 20, an input shaft 30 rotatably mounted within the transmission casing assembly 38 and arranged coaxially with the crankshaft 26, an output shaft 32 rotatably mounted within the transmission casing assembly 38 in parallel with the input shaft 30, and a change-speed gearing mounted on the input and output shafts 30, 32, and a final drive gearing 28 assembled with the casing assembly 38. The final drive gearing 28 comprises a ring gear 36 permanently in mesh with an output gear 34 integral with output shaft 32, and a differential gear unit 40 of the bevel gear type for front-wheel drive on which the ring gear 36 is fixedly mounted. The differential gear unit 40 includes a pair of side gears 42 and 44 which are drivingly connected to front-wheel axles 46 and 48 respectively. The transmission casing assembly 38 comprises first, second and third casing sections 50, 52 and 54.

Figure 2:
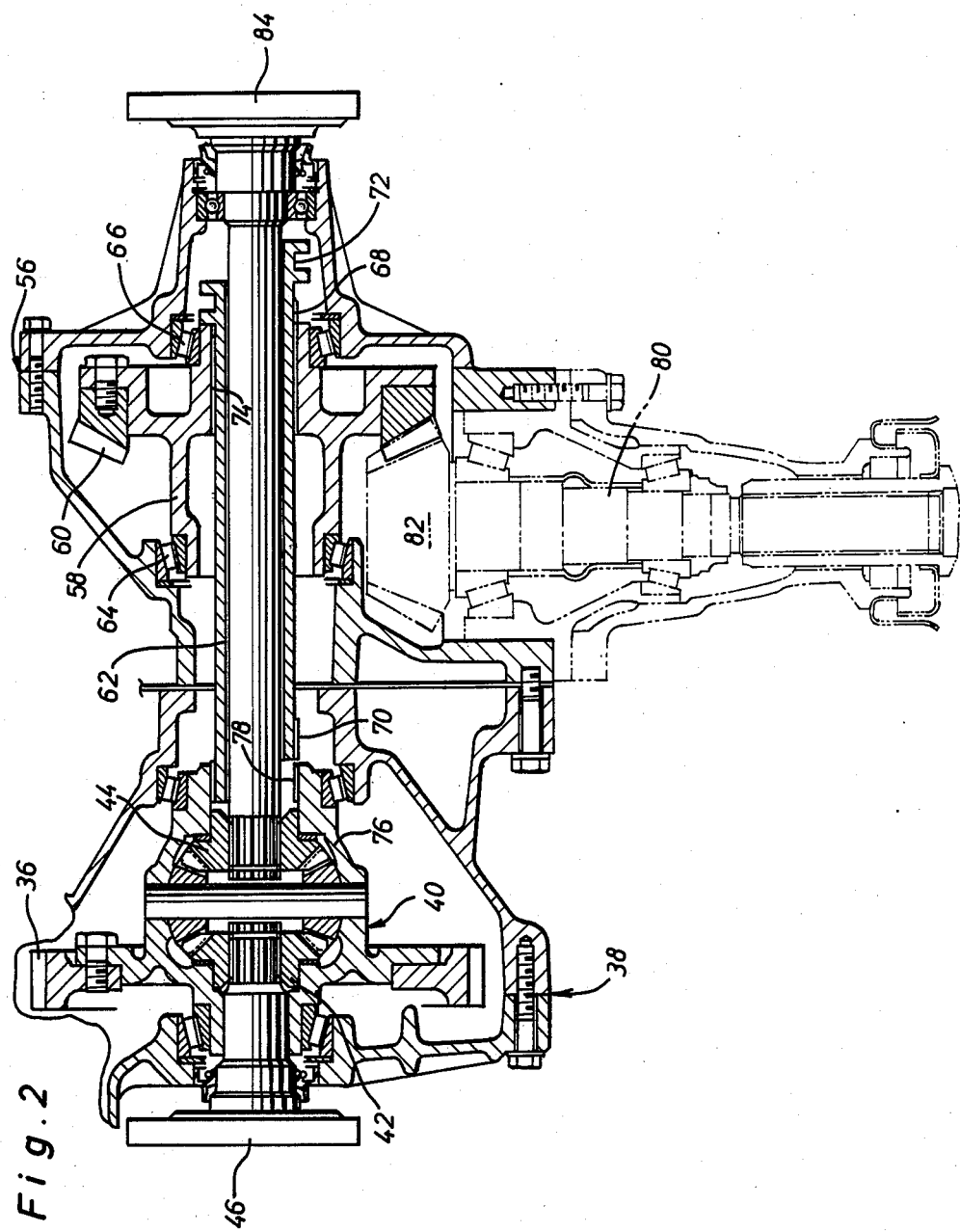
FIG. 2 is a sectional view of a power transfer device in combination with the power transmission of FIG. 1 in accordance with the present invention.
Figure 3:
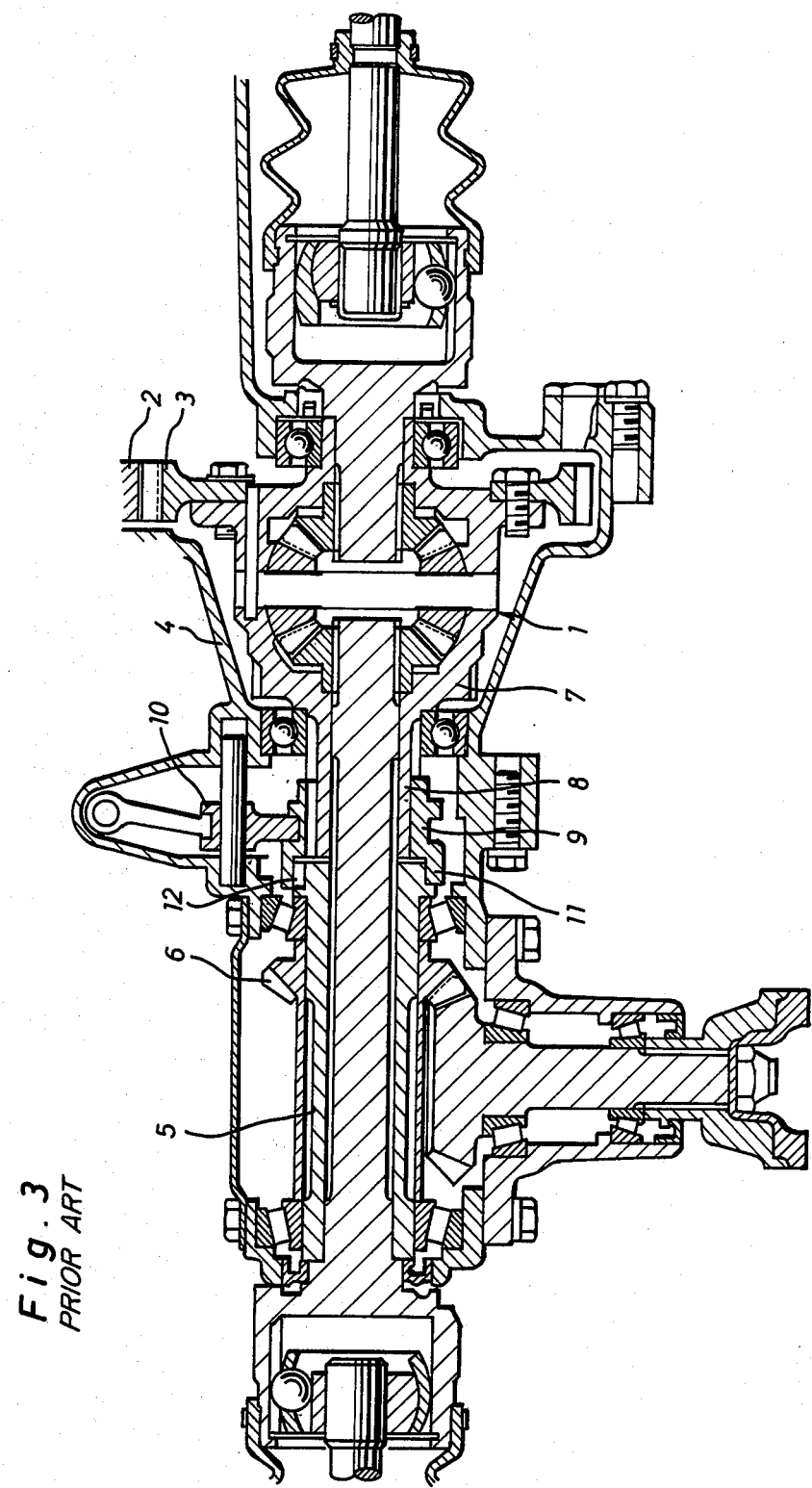
FIG. 3 is a sectional view of a conventional power transfer device in combination with the power transmission.

In FIG. 2 there is illustrated the power transfer device for four-wheel drive according to the present invention, in which a transfer casing assembly 56 is detachably secured in a fluid-tight manner at its left end seating face to the right end seating face of first casing section 50 for the transmission casing 38. In this embodiment, the transfer casing assembly 56 is located at the rear of the engine 20 and is constructed to be divided into left and right casings. In the case that the differential gear unit 40 is arranged below the input and output shafts 30 and 32 of the power transmission 22, the transfer casing assembly 56 is located below the engine 20.

Assembled within the transfer casing assembly 56 are a carrier member 58, a second ring gear 60 and a hollow shaft 62 coaxial with the differential gear unit 40. The carrier member 58 is rotatably supported by a pair of tapered roller bearings 64 and 66 which are carried on the transfer casing assembly 56. The second ring gear 60 is fixedly mounted on the carrier member 58 and permanently in mesh with a drive pinion 82 of a pinion shaft 80 which is rotatably mounted within the transfer casing assembly 56 in a fore-and-aft direction of the vehicle. The pinion shaft 80 is drivingly connected in a usual manner to rear-wheel axles (not shown) by way of a propeller shaft and a final drive gearing for rear-wheel drive. In such an arrangement, the front-wheel axle 48 of the original differential gear unit 40 is replaced with a front-wheel axle 84 which extends outwardly through the hollow shaft 62 and is rotatably supported from the transfer casing assembly 56. The hollow shaft 62 is arranged in surrounding relationship with the front-wheel axle 84 to selectively effect engagement and disengagement between the gear case 76 of differential gear unit 40 and the carrier member 58. For this purpose, the hollow shaft 62 is formed at its right end portion with an external spline 68 which is axially slidably in engagement with an internally splined bore 74 of carrier member 58. The hollow shaft 62 is further formed at its left end portion with an external spline 70 which is arranged to be engaged with an internally splined bore 78 of the gear case 76. An annular groove 72 in the right end of hollow shaft 62 is provided to be engaged with a shift fork (not shown) for shifting of the hollow shaft 62. When shifted inwardly, as is illustrated by an upper half in the figure, the hollow shaft 62 is brought into engagement with the internally splined bore 78 of gear case 76 at its external spline 70 to drivingly connect the carrier member 58 to the differential gear unit 40. When shifted outwardly, as is illustrated by a lower half in the figure, the hollow shaft 62 disengages from the gear case 76 to disconnect the power transmission between the differential gear unit 40 and the support member 58.

In operation of the power transfer device for four-wheel drive in combination with the power transmission 22, the driving power of engine 20 is applied to the input shaft 22 through the clutch device 24 and transmitted at a selected gear ratio to the output shaft 32 by way of the change-speed gearing. Subsequently, the driving power from output shaft 32 is applied to the diifferential gear unit 40 by way of the ring gear 36. Thus, the transmitted driving power is split into two torque delivery paths and applied to the side gears 42 and 44. The driving torque from side gear 42 is transmitted to the front-wheel axle 46, while the driving torque from side gear 44 is transmitted to the front-wheel axle 84. Assuming that engagement of the carrier member 58 with the gear case 76 of unit 40 is effected by inward shifting of the hollow shaft 62, the driving torque from gear case 76 is transmitted to the carrier member 58 to drive the second ring gear 60. The driving torque from ring gear 60 is transmitted to the rear-wheel axles by way of the pinion shaft 80, the propeller shaft and the final drive gearing. Assuming that the hollow shaft 62 disengages from the gear case 76 of differential gear unit 40 by its outward shifting, the driving torque is transmitted only to the front-wheel axles 46 and 84 for front-wheel drive.

From the above description, it will be understood that the original differential gear unit 40 for front-wheel drive can be adapted as a base for the power transfer device only by providing the transfer casing assembly 56, the support member 58 for rear-wheel drive, and the hollow shaft 62. This means that the power transfer device can be manufactured in a simple construction at a low cost. In the case that a conventional free-wheel hub clutch mechanism is adapted to the rear wheels, the component parts for rear-wheel drive such as the carrier member 58, second ring gear 60, hollow shaft 62 and the like remain inoperative during operation of the device for front-wheel drive to avoid power losses of the engine and to enhance durability of the parts.

Although in the above embodiment the power transfer device of the present invention is adapted to a vehicle of the front-engine front-wheel drive type, it may be adapted to a vehicle of the rear-engine rear-wheel drive type. In such a case, the second ring gear 60 is arranged to provide a front-wheel drive, and the differential gear unit 40 is arranged to provide a rear-wheel drive.

Having now fully set forth structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A power transfer device for two-wheel or four-wheel drive in combination with a power transmission having a transmission casing secured at one side thereof to a cylinder block of an internal combustion engine transversely placed on a vehicle body, an input shaft rotatably mounted within said transmission casing and arranged coaxially with a crankshaft of said engine, an output shaft rotatably mounted within said transmission casing in parallel with said input shaft, a changespeed gearing mounted on said input and output shafts, an output gear integral with said output shaft, and a differential gear unit rotatably mounted within said transmission casing and drivingly connected to said output gear, the power transfer device comprising:

a transfer casing detachably secured at one side thereof to said transmission casing;

a carrier member rotatably mounted within said transfer casing and arranged coaxially with said differential gear unit, said carrier member being formed with an internally splined bore;

an output gearing assembled within said transfer casing and arranged to be driven by said carrier member;

a first wheel axle driving connected at its inner end with said differential gear unit and extending outwardly through said transmission casing;

a second wheel axle drivingly connected at its inner end with said differential gear unit and extending outwardly through said transfer casing;

a hollow shaft arranged in surrounding relationship with said second wheel axle and axially slidably supported by said carrier member for rotation therewith, said hollow shaft being formed at one end portion thereof with an external spline in engagement with the internally splined bore of said carrier member and at the other end portion therof with an external spline selectively engageable with an internally splined bore in a differential case of said differential gear unit for selectively establishing two-wheel drive when the other end portion disengages from said differential gear unit, and four-wheel drive when the other end portion engages said differential gear unit.

2. A power transfer device as claimed in claim 1, wherein said transfer casing is located at the rear of said engine in such a manner that said first and second wheel axles are arranged in parallel with said input and output shafts of said power transmission.

3. A power transfer device as claimed in claim 2, wherein said output gearing includes a ring gear integral with said carrier member, and a pinion integral with a pinion shaft rotatably mounted within said transfer casing in a fore-and-aft direction of the vehicle, said pinion being permanently in mesh with said ring gear.

4. A power transfer device as claimed in claim 1, wherein said differential gear unit is arranged to provide a front-wheel drive, and said output gearing is arranged to provide a rear-wheel drive.

* * * * *